United States Patent Office 3,597,510
Patented Aug. 3, 1971

3,597,510
PREPARATION OF ALLYLPHOSPHONIC ACID
AND ESTERS AND SALTS THEREOF
Peter I. Pollak, Scotch Plains, and Harry L. Slates, Florham Park, N.J., assignors to Merck & Co., Inc., Rahway, N.J.
No Drawing. Filed May 15, 1968, Ser. No. 729,390
Int. Cl. C07f 9/40; A61k 22/00
U.S. Cl. 260—989                                    4 Claims

ABSTRACT OF THE DISCLOSURE

Propenylphosphonic acid and esters and salts thereof are prepared by transitional metal catalyized double bond isomerization of the corresponding allylphosphonic acid or allylphosphonate. These compounds are useful intermediates in the synthesis of antibiotically active ($\pm$)-(cis-1,2-epoxypropyl)phosphonic acid and its salts.

---

This invention relates to a new and useful process for the preparation of propenylphosphonic acid and esters and salts thereof. More particularly, this invention relates to a process for the preparation of propenylphosphonic acid and esters and salts thereof by transitional metal catalyzed double bond isomerization of the corresponding allylphosphonic acid or allylphosphonate. The propenylphosphonic acid and propenylphosphonates produced in accordance with this invention are valuable intermediate in the synthesis of ($\pm$)-(cis-1,2-epoxypropyl)phosphonic acid and its salts, compounds displaying potent anti-bacterial activity against both gram-positive and gram-negative bacteria.

In its process aspect, therefore, the instant invention may be described as residing in the concept of a method for preparing propenylphosphonic acid and esters and salts thereof which comprises subjecting allylphosphonic acid or an ester or a salt thereof in a suitable solvent to the catalytic action of a transitional metal compound.

Applicants' invention is based upon the discovery that in the presence of a transitional metal catalyst, the double bond in allylphosphonic acid or an allylphosphonate shifts to the 1,2-position with the formation of the corresponding propenylphosphonic acid or propenylphosphonate. The isomerization proceeds readily under mild condition without undesirable competitive side reactions.

As indicated above, the starting materials employed in the process of this invention are allylphosphonic acid or esters or salts thereof. The nature of the allylphosponic acid ester employed is not critical to the process of the invention; any desired allylphosphonic acid ester being a suitable starting material. Typical allylphosphonic acid ester starting materials, therefore, will include, for example, mono- and diloweralkyl allylphosphonates such as methyl and dimethyl allylphosphonate, ethyl and diethyl allylphosphonate, methyl ethyl allylphosphonate, propyl and dipropyl allylphosphonate, n-butyl and di-n-butyl allylphosphonate, n-hexyl and di-n-hexyl allylphosphonate, amyl n-hexyl allylphosphonate, n-octyl and di-n-octyl allylphosphonate and t-butyl n-octyl allylphosphonate; mono- and diloweralkenyl allylphosphonates such as vinyl and divinyl allylphosphonate, allyl and diallyl allylphosphonate, propenyl and dipropeny allylphosphonate, propenyl crotyl allylphosphonate and crotyl and dicrotyl allylphosphonate; mono- and diloweralkynyl allylphosphonates such as ethynyl and diethynyl allylphosphonate, propargyl and dipropargyl allylphosphonate and ethynyl propargyl allylphosphonate; mono- and dicycloloweralkyl allylphosphonates such as cyclopropyl and dicyclopropyl allylphosphonate, cyclopentyl and dicyclopentyl allylphosphonate, cyclopropyl cyclohexyl allylphosphonate and cyclohexyl and dicyclohexyl allylphosphonate; mono- and diaryl allylphosphonates, such as phenyl and diphenyl allylphosphonates and naphthyl and dinaphthyl allylphosphonate; and mono- and diaralkyl allylphosphonates such as benzyl and dibenzyl allylphosphonate and tolyl and ditolyl allylphosphonates. These allylphosphonic acid esters are either known compounds or may be prepared by conventional methods fully described in the art.

Where it is desired to employ allylphosphonic acid as the starting material, it is readily obtained by acid hydrolysis of an allylphosphonic acid ester such as described above. Thus, allylphosphonic acid may be prepared conveniently by treating diethyl allylphosphonate with an aqueous mineral acid such as hydrochloric or sulfuric acid. The reaction mixture may be heated to about 80° to 120° C,. if desired, and the hydrolysis is usually complete in about 1 to 15 hours. The allylphosphonic acid then may be recovered from the reaction mixture by conventional techniques.

Salts of allylphosphonic acid which may be employed as starting materials will include mono- and dialkali metal and alkaline earth metal salts such as, for example, sodium and disodium allylphosphonate, potassium and dipotassium allylphosphonate, calcium allylphosphonate, barium allylphosphonate, magnesium allylphosphonate and the like. Ammonium and organic amine salts such as, for example, ammonium and diammonium allylphosphonate, methylammonium and dimethylammonium allylphosphonate, ethylammonium and diethylammonium allylphosphonate, benzylammonium and dibenzylammonium allylphosphonate, and the like may also be employed as starting materials. These salts are conveniently prepared from allylphosphonic acid by conventional salt formation techniques.

The isomerization reaction of this invention is carried out in the presence of a proton donating solvent which serves not only as solvent but as a co-catalyst for the isomerization. Any proton donating solvent may be employed including, for example, water; alcohols such as methanol, ethanol, propanol and butanol; ketones such as acetone and methylethyl ketone; carboxylic acids such as acetic and trifluoroacetic acid; and mineral acids such as hydrochloric and sulfuric acid. Where acidic solvents are employed, and particularly where mineral acids are used, it may be desirable to employ also a small quantity of an inert organic solvent such as dioxane or tetrahydrofuran in order to increase the solubility of the starting material in the reaction medium. In addition, solvents not proton donating per se may be rendered proton donating by carying out the reaction in the presence of hydrogen. In this way, inert organic solvents such as, for example, hexane, benzene, petroleum ether, dioxane, tetrahydrofuran, dimethylformamide, chloroform, methylene chloride and the like may be employed; the reaction being carried out in a pressure vessel under a positive hydrogen atmosphere.

The transitional metal catalysts employed in the process of this invention are compounds of the transitional metals such as, for example, iron, nickel, cobalt, ruthenium, rhodium, palladium, osmium, iridium, platinum, molybdenum, manganese and chromium. Typical compounds of the transitional metals which may be employed as catalysts are, for example, iron pentacarbonyl, nickel acetoacetonate, nickel chloridepyridine complex, cobalt octacarbonyl, rhodium trichloride, palladium dichloride, palladium diacetatetriethylaluminum, iridium tribromide, chloroplatinic acid, ruthenium dichloride-tetra-triphenylphosphine, osmium octacarbonyl, iridium tribromide, ruthenium chloride-tetra-triphenylphosphine, molybenum hexacarbonyl, manganese decacarbonyl and chromium tris-acetoacetonate or mixtures thereof.

In general, the process of this invention is carried out by contacting allylphosphonic acid or an ester or a salt thereof in solution in a proton donating solvent with a catalytic quantity of transitional metal catalyst. The quantity of catalyst employed is conveniently from about 0.1 to about 10.0 percent by weight of the allylphosphonic acid starting material. The reaction may be carried out at temperatures ranging from about room temperature of reaction mixture and will usually require from about 20 minutes to about 5 hours for completion.

It will be appreciated by those skilled in the art that propenylphosphonic acid or its esters and salts, due to the 1,2-position of the double bond, may exist in either the cis- or trans- form. The process of this invention is not stereo-specific and propenylphosphonic acids, esters or salts produced thereby are mixtures of the cis- and trans-isomers. These mixtures of cis- and trans-isomers are readily separated by techniques conventional in the art including, for example, column chromatography, vapor phase chromatograph, fractional distillation and fractional crystallization.

As noted above, the propenylphosphonic acid or esters and salts thereof prepared according to the process of this invention are valuable intermediates in the synthesis of racemic ($\pm$)-(cis-1,2-epoxypropyl)-phosphonic acid and its salts. These compounds, and particularly the (−) form, are active against Bacillus, Escherichia, Staphylococci, Salmonella and Proteus pathogens, including antibiotic resistant strains thereof, such as, for example, *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes*. Thus, ($\pm$)-(cis-1,2-epoxypropyl)phosphonic acid and its salts can be used as anticeptic agents to remove susceptible organisms from pharmaceutical, dental and medical equipment from other areas subject to infection by such organisms. Similarly, they can be used to separate certain microorganisms from mixtures of microorganisms.

The cis-propenylphosphonic acid and the salts thereof prepared in accordance with the process of this invention are converted into racemic ($\pm$)-(cis-1,2-epoxypropyl)phosphonic acid by treating them with an epoxidizing agent. Epoxidation, for example, is accomplished by reacting the cis-popenylphosphonic acid or salt thereof with hydrogen peroxide in the presence of a neutral tungstic acid salt as a catalyst. Typical of such tungstic acid salts are, for example, ammonium tungstate; alkali metal tungstates such as sodium or potassium tungstates; alkaline earth tungstates such as calcium or barium tungstate; and other metal tungstates such as zinc tungstate, tin tungstate, aluminum tungstate and the like. The catalyst can be added to the reaction mixture as such, or as a solution, or it may be formed in the reaction mixture by adding tungstic acid sufficient based to form the desired tungstic acid salt. The reaction may be carried out at temperatures between about 30° to about 90° C. by dissolving the cis-propenylphosphonic acid or salt thereof in water, adjusting the pH of the solution to about pH 5.5 to 6.0 with a base such as sodium bicarbonate (where a salt is employed, this step is unnecessary); adding the catalyst and then the hydrogen peroxide. After completion of the reaction ($\pm$)-(cis-1,2-epoxypropyl)phosphonic acid, as a salt, is recovered from the reaction mixture by evaporation to dryness.

The cis-propenylphosphonic acid esters prepared in accordance with the process of this invention are converted into ($\pm$)-(cis-1,2-epoxypropyl)phosphonic acid or its salts by first converting them to the free acid or a salt thereof by conventional acid hydrolysis and then epoxidizing by the techniques described above.

The trans-propenylphosphonic acid and esters and salts thereof remaining after the isolation of the corresponding cis-isomers are not used directly in the preparation of the antibiotically active ($\pm$)-(cis - 1,2 - epoxypropyl)phosphonic acid or its salts. These transcompounds, however, when subjected to further treatment with transitional metal catalysts according to the techniques already described, are converted into an equilibrium cis/trans-mixture from which the cis-isomer can be isolated as before. In this way, the transisomer serves as a source of additional cis-isomer which can be converted as before to antibiotically active end products.

The best mode contemplated by applicants for carrying out their invention will be illustrated in the following examples; it being understood that no limitation is intended except as set forth in the appended claims.

EXAMPLE 1

Diethyl allylphosphonate 0.5 mole of triethylphosphite is placed in a flask fitted with a fractionating column and heated by an oil bath to 165°–175° C. When temperature reaches 100° C., the addition of 0.5 mole of allyl bromide is commenced. Addition is at the same rate as ethyl bromide is distilled. When the addition is complete, the reaction mixture is fractionated to recover the diethyl allylphosphonate.

By employing the requisite molar quantities of appropriately substituted phosphites in the above process, any desired allylphosphonic acid ester can be obtained.

EXAMPLE 2

Allylphosphonic acid 9.7 g. of di-n-butyl allylphosphonate in 80 ml. of concentrated hydrochloric acid is refluxed for 15 hours. The reaction mixture is cooled to room temperature and concentrated in vacuo with heating. 50.0 ml. of water is added to the residue and the evaporation is repeated. The residue is dissolved in ether and extracted with water. The aqueous extract is evaporated and the residue is purified by dissolving it in ether, extracting with water and evaporating the aqueous extract.

By repeating the hydrolysis described above, allylphosphonic acid can be prepared from any desired allylphosphonic acid ester.

EXAMPLE 3

Cis-propenylphosphonic acid 10.0 g. of diethyl-cis-propenylphosphonate in 100 ml. of concentrated hydrochloric acid is refluxed for 12 hours. The reaction mixture is cooled to room temperature and concentrated in vacuo with heating. 50.0 ml. of water is added to the residue and the evaporation is repeated. The residue is dissolved in ether and extracted with water. The aqueous extract is evaporated and the residue is purified by dissolving it in ether, extracting with water and evaporating the aqueous extract.

By repeating the hydrolysis described above, cis-propenylphosphonic acid may be prepared from any desired cis-phosphonic acid ester.

EXAMPLE 4

Sodium allylphosphonate 0.2 mole of allylphosphonic acid is dissolved in 100 ml. of water. The pH of the aqueous solution is adjusted to 5.5 to 6.0 by the addition of 0.2 mole of sodium bicarbonate. The solution is evaporated to dryness.

EXAMPLE 5

Diethyl cis-propenylphosphonate 20.0 g. of diethyl allylphosphonate is added to a solution of 0.2 g. of rhodium trichloride and 20.0 ml. of ethanol and the mixture is heated at 60° C. for one hour. The solvent is removed at reduced pressure and the residue is taken up with the hexane. The catalyst is removed by filtration. The filtrate is concentrated to dryness to obtain a mixture of cis- and trans-diethyl propenylphosphonate. The mixture is distilled under reduced pressure through a fractionating column to separate the cis- and trans-isomers. (cis- B.P. 142° C. at 13 mm.).

EXAMPLE 6

Methyl ethyl cis-propenylphosphonate 20.0 g. of methyl ethyl allylphosphonate, 0.2 g. of chloroplatinic acid, 0.3 g. of stannous chloride and 100 ml. of trifluoroacetic acid is mixed and heated at 60° C. for 2 hours. The reaction mixture is diluted with hexane and filtered to remove the catalyst. The filtrate is evaporated to dryness to obtain a mixture of cis- and trans-methyl ethyl propenylphosphonate. The mixture is chromatographed on a column of a mixture of 180.0 g. of silica gel and 150.0 g. of super-cel using chloroform as the eluent. Progress is monitored by thin-layer chromatography (silica gel, 10% MeOH in CHCl$_3$, iodine development). 75 ml. fractions is collected after the product begins to elute. Clean separation of isomers is obtained.

EXAMPLE 7

Allyl cis-propenylphosphonate

To 20.0 ml. of propanol there is added 20.0 g. of allyl allylphosphonate and 0.5 g. of iron pentacarbonyl. The mixture is heated at 80° C. for 3 hours. The solvent is removed at reduced pressure and the residue is taken up in hexane. The hexane solution is filtered and the filtrate is concentrated to dryness to obtain a mixture of cis- and trans-allyl propenylphosphonate. 1.0 g. of the mixture is treated in an Aerograph Autoprep vapor phase chromatography machine using a three-eights inch 15% SE 30 column to obtain a separation of the cis- and trans-isomers.

EXAMPLE 8

Dipropargyl cis-propenylphosphonate

The procedure of Example 5 is repeated using 20.0 g. of dipropargyl allylphosphonate instead of diethyl allylphosphonate, 0.3 g. of nickel acetoacetonate instead of rhodium trichloride, and 50.0 ml. of acetone instead of ethanol.

EXAMPLE 9

Cyclopropyl cis-propenylphosphonate

The process of Example 5 is repeated using 20.0 g. of cyclopropyl allylphosphonate instead of diethyl allylphosphonate, 50.0 ml. of methyl ethyl ketone instead of ethanol, and 0.2 g. of cobalt octacarbonyl instead of rhodium trichloride.

EXAMPLE 10

Diphenyl cis-propenylphosphonate

The process of Example 5 is repeated using 20.0 g. of diphenyl allylphosphonate instead of diethyl allylphosphonate, 100.0 ml. of acetic acid instead of ethanol and 0.5 g. of palladium diacetate-triethylaluminum instead of rhodium trichloride.

EXAMPLE 11

Dibenzyl cis-propenylphosphonate

The process of Example 5 is repeated using 20.0 g. of dibenzyl allylphosphonate instead of diethyl allylphosphonate, 20.0 ml. of butanol instead of ethanol, and 0.5 g. of iridium tribromide instead of rhodium trichloride.

EXAMPLE 12

Diisopropyl cis-propenylphosphonate

The process of Example 5 is repeated using 20.0 g. of diisopropyl allylphosphonate instead of diethyl allylphosphonate, 20.0 ml. of methanol instead of ethanol, and 0.2 g. of ruthenium dichloride-tetra-triphenylphosphine instead of rhodium trichloride (cis- B.P. 45° C. at 0.15 mm.).

EXAMPLE 13

Cis-propenylphosphonic acid

The procedure of Example 5 is repeated using 20.0 g. of allylphosphonic acid instead of diethyl allylphosphonate, 50.0 ml. of water instead of ethanol, and 0.3 g. of osmium octacarbonyl instead of rhodium trichloride.

EXAMPLE 14

Disodium cis-propenylphosphonate

The process of Example 5 is repeated using 20.0 g. of disodium allylphosphonate instead of diethyl allylphosphonate, 50.0 ml. of water instead of ethanol, and 0.2 g. of iridium tribromide instead of rhodium trichloride.

EXAMPLE 15

Calcium cis-propenylphosphonate

The process of Example 5 is repeated using 20.0 g. of calcium allylphosphonate instead of diethyl allylphosphonate, 20.0 ml. of isopropanol instead of ethanol, and 0.5 g. of ruthenium chloride-tetra-triphenylphosphine instead of rhodium trichloride.

EXAMPLE 16

Ammonium cis-propenylphosphonate

The process of Example 5 is repeated using 20.0 g. of ammonium allylphosphonate instead of diethyl allylphosphonate and 0.3 g. of manganese decacarbonyl instead of rhodium trichloride.

EXAMPLE 17

Benzylammonium cis-propenylphosphonate

The process of Example 5 is repeated using 20.0 g. of benzylammonium allylphosphonate instead of diethyl allylphosphonate, 100 ml. of acetic acid instead of ethanol, and 0.3 g. of chromium tris-acetoacetonate instead of rhodium trichloride.

EXAMPLE 18

Sodium (±)-(cis-1,2-epoxypropyl)phosphonic acid

Cis-propenylphosphonic acid (2.2 g., .018 mole) is dissolved in 10 ml. of water. The pH of the aqueous solution is adjusted to 5.5 to 6 by the addition of sodium bicarbonate (1.51 g., .017 mole). Sodium tungstate dihydrate (.55 g., .0017 mole) is added, and the nearly neutral solution is placed in a water bath and heated to 55° C. The water bath is then removed, and 2 ml. of 30% hydrogen peroxide are added to the reaction mixture during 10 minutes. The reaction is exothermic, and the temperature rises to 65° C. during addition of the peroxide. An additional 1.6 ml. of hydrogen peroxide is added. Oxygen evolves from the solution during the addition, and the temperature remains at 55°–57° C. without external heating. After standing 20 minutes, the temperature falls to 53° C. The reaction mixture is then heated in a water bath at 55° C. for an additional 20 minutes, after which the solution is freeze-dried to yield the monosodium salt of (±)-(cis-1,2-epoxypropyl)-phosphonic acid as a white powder, which is characterized by vapor phase chromatography and NMR spectra.

EXAMPLE 19

Ammonium (±)-(cis-1,2-epoxypropyl)phosphonate 0.4 mole of ammonium cis-propenylphosphonate is dissolved in 10.0 ml. of water and 10.0 mg. of sodium tungstate is added. The mixture is heated to 55° C. on a water bath. 5.0 cc. of hydrogen peroxide is added slowly and heating is continued at 55° C. for 1.5 hours. The reaction mixture is cooled to room temperature and the solvent is removed by freeze-drying. The residue is dissolved in 50 ml. of methanol and the solids separated by filtration. The filtrate is evaporated to dryness.

EXAMPLE 20

Di-n-hexyl cis-propenylphosphonate

A mixture of 20.0 g. of di-n-hexyl allylphosphonate, 0.2 g. of rhodium trichloride and 40 ml. of hexane is placed in a pressure vessel. The vessel is filled with hydrogen to a pressure of 2 p.s.i.g. and sealed. The contents of the vessel is heated at 100° C. for 2 hours. The vessel is vented at ordinary temperature and the contents are filtered. The filtrate is concentrated to obtain a mixture of cis and trans-di-n-hexyl propenylphosphonate. The mixture is distilled under reduced pressure through a fractionating column to separate the cis- and trans-isomers.

EXAMPLE 21

Disodium cis-propenylphosphonate

The procedure of Example 20 is repeated using 20.0 g. of disodium allylphosphonate instead of di-n-hexyl allylphosphonate, 50 ml. of water instead of hexane and 0.5 g. of manganese decacarbonyl instead of rhodium trichloride.

EXAMPLE 22

Dipropargyl cis-propenylphosphonate

The procedure of Example 20 is repeated using 20.0 g. of dipropargyl allylphosphonate instead of di-n-hexyl allylphosphonate, 40 ml. of benzene instead of hexane and 0.5 g. of iridium tribromide instead of rhodium trichloride.

The (−) (cis-1,2-epoxypropyl)phosphonic acid referred to herein rotates plane-polarized light in a counterclockwise direction (to the left as viewed by the observer) when the rotation of its disodium salt is measured in water (5% concentration) at 405 mμ.

The designation cis used in describing the 1,2-epoxypropylphosphonic acid compounds means that each of the hydrogen atoms attached to carbon atoms 1 and 2 of the propylphosphonic acid are on the same side of the oxide ring.

The subject matter which applicants regard as their invention is particularly pointed out and distinctly claimed as follows:

1. A process which comprises heating allylphosphonic acid, an ester of allylphosphonic acid selected from the group consisting of loweralkyl, loweralkenyl, loweralkynyl, cycloloweralkyl, aryl, and aralkyl esters, or a salt selected from the group consisting of alkali metal, alkaline earth metal, ammonium, or organic amine salts of allylphosphonic acid with a transitional metal catalyst selected from the group consisting of iron pentacarbonyl, nickel acetoacetonate, nickel chloride-pyridine complex, cobalt octacarbonyl, rhodium trichloride, palladium dichloride, palladium diacetate triethylaluminum, iridium tribromide, chloroplatinic acid, ruthenium dichloride-tetra-triphenylphosphine, osmium octacarbonyl, ruthenium chloride-tetra-triphenylphosphine, molybdenum hexacarbonyl, manganese decacarbonyl, chromium tris-acetoacetonate and mixtures thereof in the presence of a proton donating solvent selected from the group consisting of water, methanol, ethanol, propanol, butanol, acetone, methylethyl ketone, acetic acid, trifluoroacetic acid, hydrochloric acid and sulfuric acid at a temperature of from room temperature to 80° C. to produce propenylphosphonic acid or the corresponding ester or salt thereof.

2. The process of claim 1 wherein the quantity of transitional metal catalysts employed is from about 0.1 to about 10.0% by weight of the allylphosphonic acid starting material.

3. A process which comprises heating allylphosphonic acid, an ester thereof selected from the group consisting of loweralkyl, loweralkenyl, loweralkynyl, cycloloweralkyl, aryl, and aralkyl esters, or a salt of allylphosphonic acid, selected from the group consisting of alkali metal, alkaline earth metal, ammonium and organic amine salts, with a transitional metal catalyst selected from the group consisting of iron pentacarbonyl, nickel acetoacetonate, nickel chloride-pyridine complex, cobalt octacarbonyl, rhodium trichloride, palladium dichloride, palladium diacetate triethylaluminum, iridium tribromide, chloroplatinic acid, ruthenium dichloride-tetra-triphenyl phosphine, osmium octacarbonyl, ruthenium chloride-tetra-triphenylphosphine, molybdenum hexacarbonyl, manganese decacarbonyl, chromium tris-acetoacetonate and mixtures thereof in the presence of an inert organic solvent selected from the group consisting of hexane, benzene, petroleum ether, dioxane and tetrahydrofuran, and hydrogen at a temperature of from room temperature to 100° C. to produce propenylphosphonic acid or the corresponding ester or salt thereof.

4. The process of claim 3 wherein the quantity of transitional metal catalysts employed is from about 0.1 to about 10.0% by weight of the allylphosphonic acid starting material.

References Cited

UNITED STATES PATENTS 2,685,602    8/1954    Woodstock et al. ___ 260—502.4

CHARLES B. PARKER, Primary Examiner

A. H. SUTTO, Assistant Examiner

U.S. Cl. X.R.

260—348R, 501.21, 502.4, 683.2, 956; 424—203